Nov. 23, 1937.  V. BERAN  2,100,155

ELECTRICAL PURIFICATION OF GASES

Filed Dec. 19, 1935  3 Sheets-Sheet 1

INVENTOR.
V. Beran
BY Glascock Downing & Seebold
ATTORNEYS.

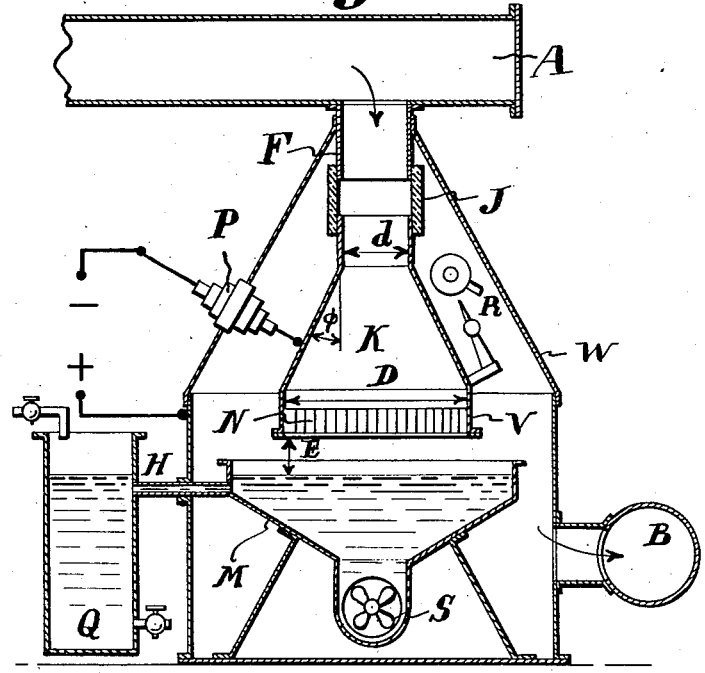
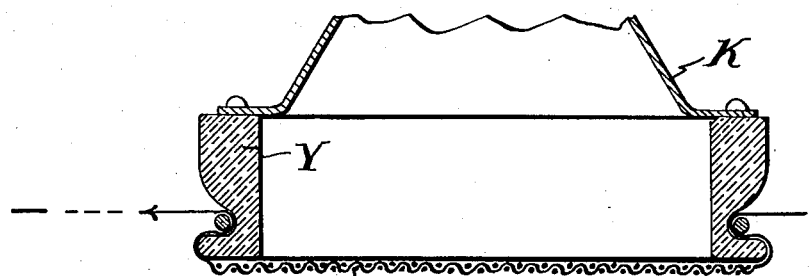
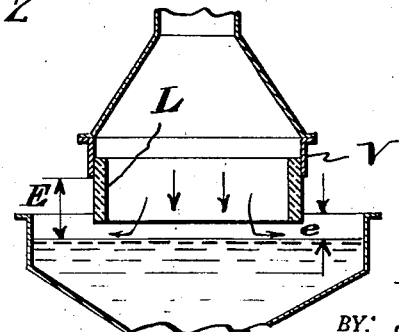

Nov. 23, 1937.　　　V. BERAN　　　2,100,155
ELECTRICAL PURIFICATION OF GASES
Filed Dec. 19, 1935　　　3 Sheets-Sheet 3
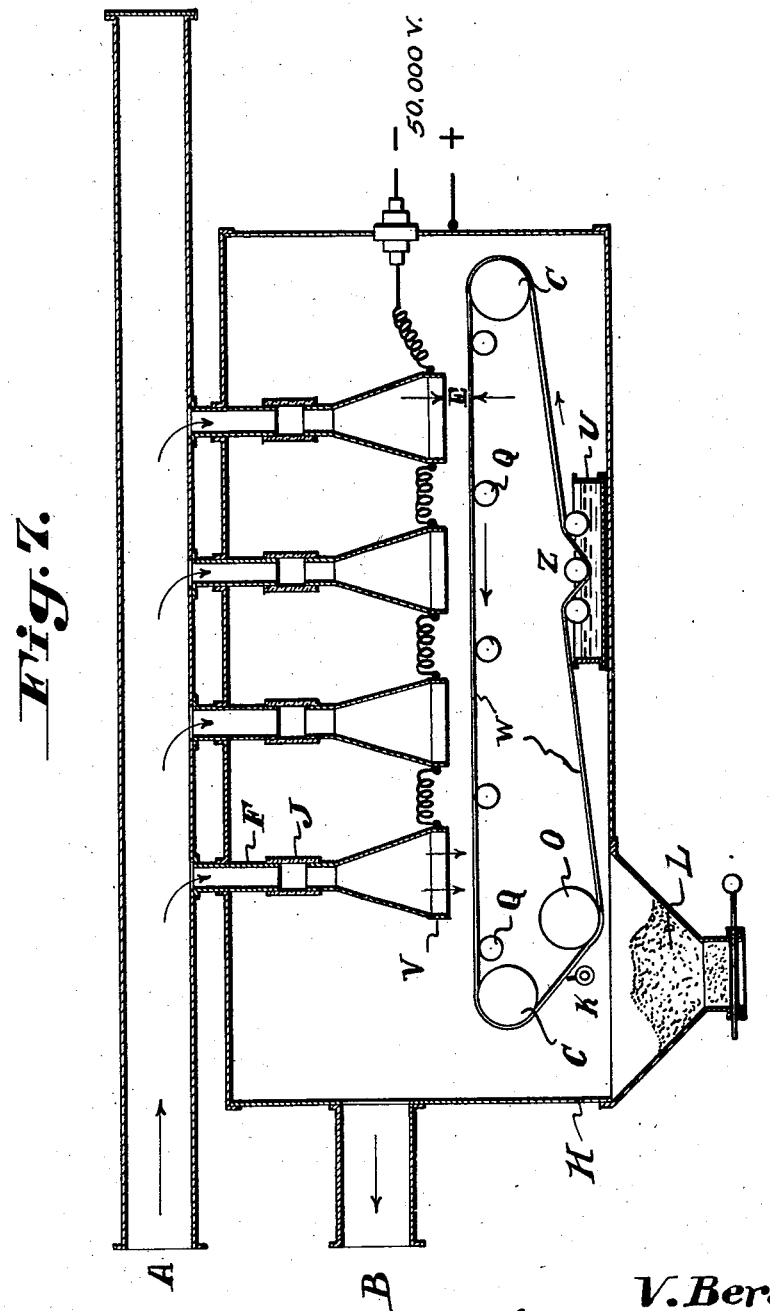
INVENTOR:
V. Beran
BY Glascock Downing & Seebold
ATTORNEYS.

Patented Nov. 23, 1937

2,100,155

UNITED STATES PATENT OFFICE 2,100,155

ELECTRICAL PURIFICATION OF GASES

Vojtěch Beran, Pribram, Czechoslovakia

Application December 19, 1935, Serial No. 55,281
In Czechoslovakia December 22, 1934

4 Claims. (Cl. 183—7)

Devices are already known for the electrical removal of dust from gases and for the electrical purification of gases, in which the gas to be freed from dust flows out of a collecting pipe into a perpendicular dust-collecting tube. In this dust-collecting tube is suspended in the axis of the tube a wire which is insulated and is connected with the negative pole of a continuous-current high voltage conductor, while the metallic dust-collecting tube is connected to the positive pole of this system or else earthed.

Between the wire and the dust-collecting tube is therefore formed an electrostatic field. The particles of dust passing into this field with the current of gas become electrically charged and are driven in a known manner against the wall of the tube, to which they adhere. With these known structures the individual particles of dust therefore have to be driven against the sides of the tube transversely to the action of their weight and transversely to the direction of flow of the gas. The usually dry dust deposited on the tube wall frequently does not adhere firmly enough, so that particles of dust can be taken up again from the tube wall by the current of gas and carried along with it. For the purpose of complete removal of dust it is necessary with these devices to vary the electrical voltage between the wire electrode and the tube wall, in order to adapt it to various operative conditions.

Now the object of the present invention is to provide an electrical dust-removing appliance for gases wherein the aforementioned disadvantages are eliminated, and the efficiency greatly improved as compared with known apparatus.

Apparatus for carrying out the invention is illustrated by way of example in the accompanying drawings, in which Figure 1 shows diagrammatically in section, for purpose of comparison, a known constructional form of electrical apparatus for removing dust from gases;

Figure 4 shows a constructional example of the invention diagrammatically in section;

Figures 5 and 6 show details of this construction in section, and

Figure 7 shows a modified form of construction of the invention in sectional elevation.

Figure 1:
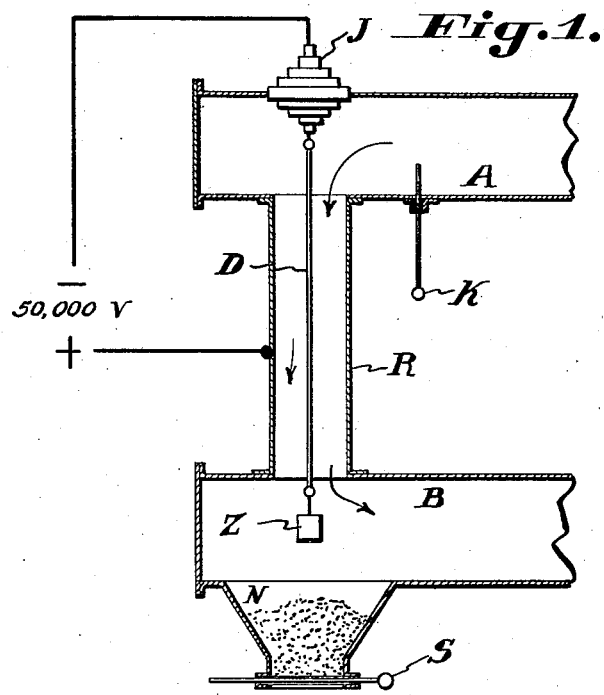

In the known arrangement shown in Figure 1, the gas to be purified passes in the direction of the arrows from a main collecting tube A through a perpendicular dust-removing tube R into a pipe line B for the purified gas. In the axis of the tube R is suspended a wire D, which is kept taut by means of a weight Z. The wire is insulated from the sides of the tube A by means of an insulator J, of hard porcelain for example. The wire is connected to the negative pole and the tube R to the positive pole of high-tension mains at about 50,000 volts for example.

As soon as the internal surface of the tube R after it has been in operation for rather a long time, has become coated with a fairly thick layer of dust, the gas supplied by A is shut off by means of a sliding valve or shutter K, the dust resting on the tube R is conveyed, by means of a device, not represented in the drawings, into a bunker N, and from here, by opening a sliding shutter S, is shot into a vehicle placed underneath it. After the cleaning of the tube R and of the bunker N, the sliding valve S is closed, the sliding valve K is opened, and the gas to be freed from dust is admitted again.

Figure 2:
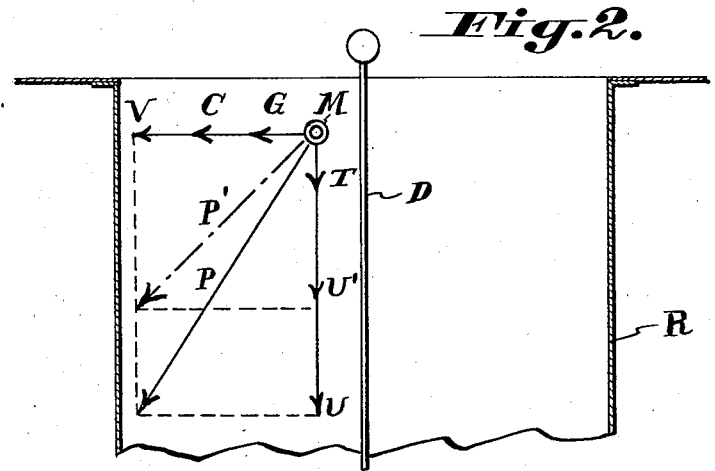
Figure 2 shows a diagram of the forces acting upon a grain of dust in the electrostatic field.

The individual particles of dust, which pass with the current of gas into the electrical field between the wire D and the internal surface of the tube R, are subjected to the action of a plurality of forces. In Figure 2, which shows an axial section through a part of the wire electrode D and the tube R on a substantially larger scale than Fig. 1, the influence of these forces upon any given grain of dust M is represented.

As soon as the grain of dust M is electrically charged it is subjected to the influence of the gradient force G of a non-homogeneous field, and is impelled by the latter in the direction from the wire to the side of the tubing. This electrically charged particle of dust is also subjected to the action of the electrostatic attraction C, which may also be in the direction from the wire to the tube wall. In consequence of the glow-discharge electricity on the wire electrode an electrical wind is produced, which impels the particle, as it were, towards the side of the tube with a force V. The force of gravity T acts upon the particle in a vertical direction. In the direction of the flow of gas, which in this case is also vertically downwards, there acts in addition a force U, which the flowing gas exerts upon the particle of dust. It is not necessary to go further into the question as to which of the horizontal forces, G, C or V is predominant during the movement of the particle of dust in the direction from the wire to the tube wall. In the vertical direction the force U exerted by the flowing gas upon the grain of dust is usually greater than the weight T of the dust particle, at least so long as the latter does not agglomerate with other particles under the action of the electrical forces and form larger and heavier grains of dust. These forces acting upon the individual particles of dust become compounded into a resultant P which impels the grain of dust from the wire to the tube wall in an oblique direction.

The removal of dust from the gas, other conditions being equal, will be more complete, the more slowly the gas flows through the dust-collecting tube R, for the smaller the force U is, U' for example, the more will the direction of the resultant force P, P' for example, approach the direction of the horizontal attracting forces G, C and V, apart from the fact that an exclusively strong flow of gas may tear off and carry along with it particles of dust which have already been deposited on the wall.

Figure 3:
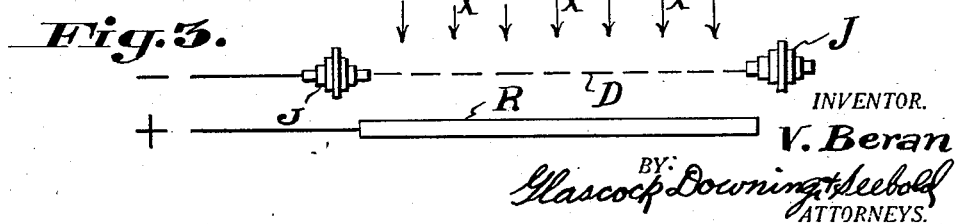
Figure 3 shows diagrammatically an arrangement with horizontal wire electrodes.

The elimination of the undesired action of the force U, which tends to drive the particles of dust off the tube wall R in the case of a vertically arranged wire electrode, may according to the present invention be effected by arranging the flow of the gas in the manner represented in Figure 3. With this arrangement the wire electrodes D are stretched in a horizontal direction between carrier J of insulating material and are connected in a known manner with the negative pole of the high-voltage mains. For the collection and deposition of the dust there is employed with this arrangement a likewise horizontal plane or surface R, which lies at a definite distance from the wire electrodes D and is connected to the positive pole or else earthed. The gas is accordingly constrained to flow in the direction of the arrows X at right angles to both electrodes D and R, that is, in the direction of the lines of force of the electrostatic field. The forces U, which are exerted upon the individual particles of dust by the current of gas, unite in this case with the forces of attraction G, C and V (compare Figure 2), so that the removal of dust from the gas is more complete than with the usual direction of flow of the gas parallel to the electrodes, as shown in Figure 2.

To a certain extent, however, even in this case, the condition that the flow of gas should not be too strong, still applies, for otherwise the removal of dust from the gas is disturbed by the impact of the gases against the surface R, and the eddies thereby produced.

When the electrodes are arranged in a horizontal direction, the result is obtained that the weights of any particles of dust that cling together add onto the forces of attraction G, C, V, whereby the action of such an electric filter is considerably improved, as compared with filters having vertical electrodes.

An important requirement for the improvement of the efficiency of the electric filter is that the electrodes D and R must be constantly kept clean. The dust deposited must where possible be continuously removed during the operation of the apparatus. To this circumstance, and also to the fact that horizontal surfaces are more difficult to clean from dust, particular attention has been paid in the construction of the apparatus according to the present invention, as hereinafter set forth.

Figure 4 shows the apparatus according to the invention in axial sectional elevation. The gases to be freed from dust pass from the main collecting tube A through a tubular element F of diameter $d$ into the apparatus. To the tubular element F is connected an insulating tube J, of hard porcelain for example, which separates the tubular element F from a funnel-shaped extension K. This extension K merges at its lower margin into a cylindrical portion V of diameter D.

The angle of inclination $\phi$ of this funnel-shaped extension K amounts to about 5°, so that the flow of gas in this portion is almost free from eddies. Since the diameter D is greater than the diameter $d$ of the tubular admission element F, the velocity of flow of the gases in the cylindrical tubular member V is less than in the tubular element F. If for example in the tubular element F the velocity of flow of the gas amounts to 6 metres per second, it falls to about 70 centimetres per second for the cylindrical extension V, whereby the diameter D is equal to $5d$.

The cylindrical tubular member V contains a bundle of fine tubes N, arranged parallel to one another, having small diameters of about 20 to 50 millimetres each. This gives rise to a rectilinear and parallel flow of gas out of the tube V.

In many cases it is sufficient, instead of these tubes N, to stretch a series of parallel wires or a wire fabric across the lower margin of the cylindrical tube V, as shown diagrammatically in Figure 5. The wire netting or wires Z may be conductively connected with the cylindrical tube V, or else may be stretched over a ring Y of insulating material, as shown in Figure 5. In this case the insulating tube J of Figure 4 may be omitted. The wire netting Z is connected with the high-voltage terminal. The insulating ring Y has upon its external periphery an annular groove, to enable the wire netting to be secured by means of a binding wire.

If a more complete removal of dust is desired, wherein even the particles of ultra-microscopic dimensions are to be deposited, none of the electrodes K or V hereinbefore described will be sufficient. In this case, according to a further feature of the invention, the gas must be passed directly on to the electrode upon which the dust is to be collected, this electrode then being constructed as a liquid surface. The liquid, water for example, therefore takes the place of the dust-collector.

The electrode V to be adopted in this case, which will hereinafter be referred to as the glow-discharge electrode, is illustrated by way of example in Fig. 6. Into this glow-discharge electrode V is inserted a tube L of insulating material, porcelain for example, by which the current of gas is guided quite close to the surface of the liquid, without the gas being able to escape laterally through the annular gap between the surface of the liquid and the tube L. The distance $e$ of the lower edge of the insulating tube L from the liquid surface must be therefore very small.

The employment of such an insulating tube L for the purpose of diminishing the breadth $e$ of the gap is advantageous because on the one hand the ultra-microscopic particles of dust require a high deposition voltage, and because on the other it is impossible to bring the electrode V so close to the surface of the water without leading otherwise to the formation of sparks or of an arc between the glow-discharge electrode V and the surface of the water.

It is self-evident that in place of a tube L of insulating material an entire collar of fine tubes of this nature might be used if required, for the purpose of conveying the current of gas in as nearly a vertical direction as possible close to the surface of the water.

The cylindrical portion V of the electrode of Figure 4 is connected through the insulator P with one pole of the high-voltage supply. For the reception of the liquid a tank M is provided, which is connected with the second pole of the high-voltage supply or else earthed.

The crude gases become electrically charged in flowing through the electrode V, and the particles of dust contained in them are thereby collected into larger grains. Upon these gases impinging upon the surface of the water, these particles of dust are deposited in consequence of the electrostatic attraction and of their adhesion on the surface of the water, the kinetic energy of the particles carried along by the current of gas also cooperating in producing this result. As soon as these particles of dust have become sufficiently moist they sink down to the bottom of the tank M, and can then be removed from the tank by means of any suitable device, for instance a worm conveyor S. The surface of the water, that is to say, the surface of the deposition electrode, is thereby constantly kept clean and smooth.

The distance E between the surface of the water and the glow-discharge electrode V can be varied by raising or lowering the water level in an auxiliary tank Q which communicates with the tank M by means of a tube H. As is known, the maintenance of a definite distance E is of great importance for the degree of completeness of the removal of dust, according to the degree of contamination of the original gas, the composition of the dust, the voltage of the supply, and so forth. If this distance E is too great the removal of dust from the gas is incomplete. If the distance is too small, there is the risk that an arc may form and short-circuit the current. According to one feature of the invention the distance between the electrodes may be adjusted to an optimum value, and may be variable to adapt it to different operative conditions.

With the devices hitherto known, in which the distance between the electrodes is constant, it is necessary to vary the voltage itself, which constitutes rather a difficult problem. Fears that the water might be caused to boil after the apparatus has been in operation for rather a long time owing to the hot gases, are in most cases without foundation, as the water, as is known, in the direction from the surface of the bath towards the bottom of the vessel, is a poorer conductor of heat than glass or porcelain for example. It has however been observed that the deposition of the dust is the more complete, the larger the quantity of vapour that is evolved from the water. If the water, when purifying unusually hot gases, should happen to boil, this may be prevented by cooling the hot water in the tank M by mixing cold water from the tank Q with it. This case, however, is not to be expected with gases of temperatures below 500° C. and with an ordinary velocity of flow through the glow-discharge electrode V.

Similarly no appreciable travel of the surface of the water, and therefore also no disturbances of the action of the apparatus will occur if the velocity of outflow of the gas from the cylindrical portion V does not materially exceed one metre per second. It is superfluous to acidify the water in order to increase its electrical conductivity, because after the apparatus has been set in operation a sufficient quantity of constituents from the gas will dissolve in the water, whereby its conductivity is improved.

It is clear that besides the sludge arising from the dust precipitated, the water serving as an electrode can also be further treated and rendered useful. It absorbs very eagerly the water-soluble constituents, and also various gaseous constituents of the gas to be purified.

As is known, a certain portion of the dust separated out, usually less than one per cent, accumulates upon the glow-discharge electrode. For the purpose of removing this dust there is employed with the usual structures an automatic knocking appliance, which is diagrammatically indicated by way of example at R in Figure 4. By knocking against the glow-discharge electrode the dust is shaken off this electrode at certain intervals of time. With the apparatus according to this invention this knocking of the electrode K, V may be omitted. The purified gases are collected in the reservoir W of the apparatus shown in Figure 4, and pass from the latter into the collecting pipe B.

For certain purposes, particularly when the water from the tank M is to be further treated after being employed therein, it is possible to add to the water definite substances so that certain constituents of the gases to be purified are absorbed and chemically combined. It is likewise possible to employ other liquids instead of water. It remains an open question what is to be done with the water when the latter can no longer be used, and is saturated with definite substances, which may be poisonous, and which it has taken up from the gas, so that it is not possible to discharge it in the open.

It will usually be necessary to supply small quantities of water to the deposition vessel continuously, since a natural loss of water occurs by evaporation. The constant supply of the make-up liquid may be provided for by a float in the tank Q, this float being adjusted to a definite height of water level.

Since the water in the deposition vessel M is at rest, and at most is hardly appreciably moved on the surface by undulations, the solid dust particles taken up by it continually sink to the bottom. The insoluble substances remain in the water. A renewal of the water in the deposition vessel will only be necessary when the water has become so far saturated with the aforementioned substances that they begin to separate out in the tank M. The time within which this state of saturation occurs is dependent upon the particular operative conditions. In normal cases, for instance in the purification of smoke gases or blast-furnace gases, the liquid need only be removed from the tank M and renewed after being in operation for a comparatively long time.

In metallurgical gases from lead or copper furnaces, the saturation of the liquid will occur sooner, since these gases contain a larger quantity of water-soluble substances. In this case the following precautions may be taken: Either the waste water is diluted to a concentration of a harmless nature, or else the poisonous substances are rendered harmless by cheap additions. Finally these highly concentrated solutions may be subjected to a further treatment to convert them into saleable products, or the device hereinafter described may be utilized, which works by a dry method, and therefore yields no waste liquid. Which of these possibilities should be used in any particular case is a matter of calculation.

For the case in which the disposal of injurious waste liquids is too difficult or too expensive, it is necessary to utilize apparatus which works similarly to that hereinbefore described but by a dry process. This apparatus according to the invention is illustrated in Figure 7, which shows four glow-discharge electrodes arranged side by side and assembled into a battery.

In this case also the gases are guided from the collecting pipe A into the individual tubes F, and pass out of the latter through the insulating tubes J into the glow-discharge electrodes V.

For these glow-discharge electrodes V one of the forms previously described may for example be employed, as in the first alternative of the apparatus shown in Figure 4. The deposition electrode is in this case not formed by a water surface but by a moving endless band W, which is electrically conductive. This band is made, according to the composition of the gases to be freed from dust, of brass plate, lead-plated sheet iron or other metal, and runs at a low speed of 10 centimetres per second for example below the electrodes V at certain distances E therefrom. The driving of the band is effected by means of driving pulleys C, between which the band is held in a horizontal position by rollers Q at a definite distance from the electrodes V. For the tensioning of the band there serves a pulley O. The glow-discharge electrodes V are insulated and connected with one pole of the high-voltage mains, and the other parts of the apparatus, including the band are connected with the other pole or else earthed.

The gases to be freed from dust flow in the direction of the arrows and impinge perpendicularly upon the band W, deposit the dust particles thereon, and then pass into a chamber which is common to all the electrodes V, and which is enclosed by a casing H, and from here into the collecting pipe B for the purified gas.

The dust deposited upon the casing is carried as far as a stripper K (a brush for instance), by which it is stripped off into the collecting receptacle, and from here is either removed automatically or led away into through waggons.

A moistening of the band will frequently enhance the efficiency of the apparatus. For this purpose there serves a vessel U, filled with water for example, through which the band is drawn by the aid of a pulley Z, and in this way moistened. Instead of water, some other liquid can of course be employed in particular cases.

With a moistened band the dust is deposited as a pasty mass. The vessel U can then also be employed for cleaning the band, as the greater part of the dust is stripped off by the stripper K, whereas the remainder of the dust is washed off immediately afterwards as the band passes through the vessel U.

The deposit of dust adheres better to the moist band than to a dry one, in consequence of the greater adhesion of the dust particles.

As already mentioned, the distance between the electrode V and the band W can be adapted to various operative conditions for the purpose of completely removing dust from the gas. For this purpose with the apparatus shown in Figure 7, the following precautions should be taken: while the shafts of the driving pulleys C of the band W are not displaceably supported, and the axis of the tensioning pulley O is displaceable, the axes of all the guiding pulleys Q are fitted in a common frame, not shown in Figure 7. This frame is displaceable in such a way that it is possible to raise or lower it in a vertical direction along with the guide pulleys Q, thus adjusting the band to a definite distance from the electrodes V.

The device for the accurate adjusting of the band can be operated in a known manner from outside, and the action of the apparatus can be inspected, if desired, through observation windows arranged in the casing H, for the purpose of adjusting the distance E of the band W from the electrodes V to the optimum value.

With the appliance according to this invention the consumption of electrical energy is indeed only slightly less than with the known appliances, but the cost of manufacture of the electric filter according to the invention amounts to only about half of the cost of the filters hitherto used for the same effect.

It has been found that the filters according to the invention work particularly advantageously if high-voltage current having a frequency of more than 1000 periods per second is employed.

What I claim is:—

1. Apparatus for the electrical removal of dust from gases, comprising electrodes arranged in horizontal parallel planes, the upper electrode being a glow discharge electrode, and the lower electrode being a liquid surface, and means for raising and lowering the surface level of the liquid relatively to the under surface of the glow discharge electrode.

2. Apparatus for the electrical removal of dust from gases, comprising a tube through which the gases to be purified flow vertically downwards, this tube being open at the bottom, wires extending in a horizontal plane across the mouth of the tube, and constituting a glow discharge electrode, and a liquid surface located close underneath the horizontal wires and constituting a dust collecting electrode.

3. Apparatus for the electrical removal of dust from gases, comprising a tube through which the gases to be purified flow vertically downwards, this tube being open at the bottom, a bundle of small vertical tubes occupying the mouth of the said tube and having their lower ends arranged in a horizontal plane to constitute a glow discharge electrode, and a liquid surface located close underneath the lower ends of the said small tubes and constituting a dust collecting electrode.

4. Apparatus for the electrical removal of dust from gases, comprising a tube through which the gases to be purified flow vertically downwards, this tube being open at the bottom, an annular extension consisting of insulating material at the lower end of the said tube, wires extending in a horizontal plane across the lower end of the said annular extension and constituting a glow discharge electrode, and a liquid surface located close underneath the horizontal wires and constituting a dust collecting electrode.

VOJTĚCH BERAN.